March 19, 1957 H. J. SCHWERDHOFER 2,785,586

SHIFT DEVICE

Filed Oct. 6, 1954 7 Sheets-Sheet 1

INVENTOR

H. J. SCHWERDHOFER

BY Young, Emery & Thompson

ATTYS.

March 19, 1957 H. J. SCHWERDHOFER 2,785,586
SHIFT DEVICE
Filed Oct. 6, 1954 7 Sheets-Sheet 2
FIG. 4
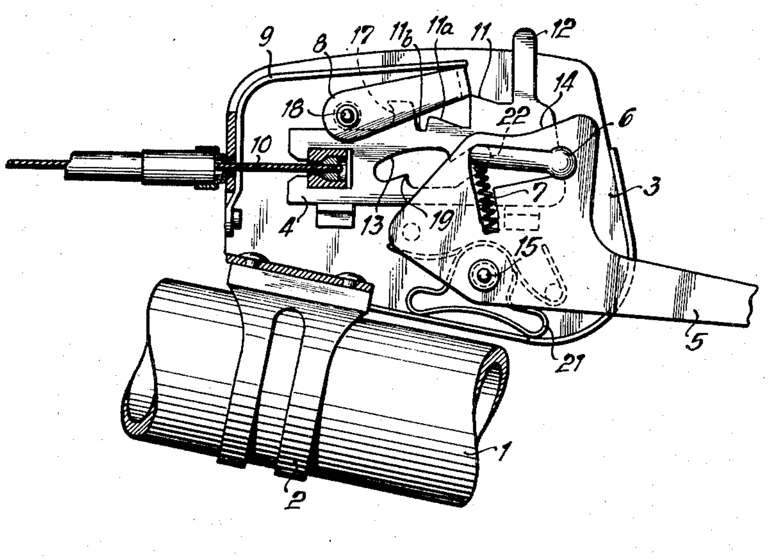
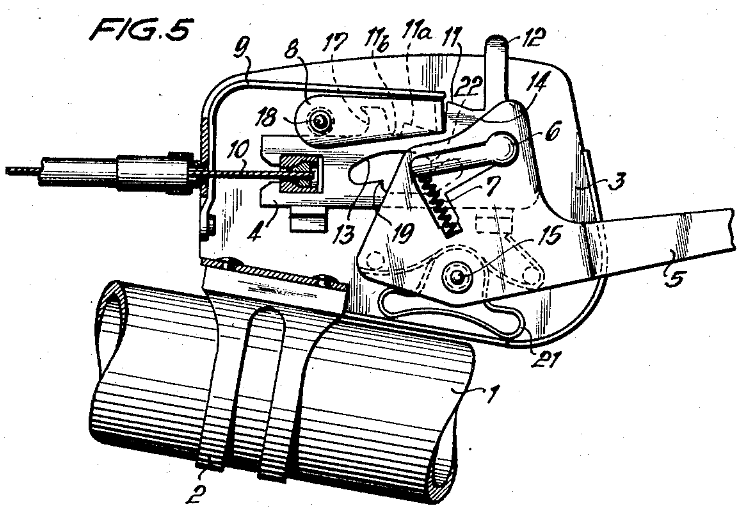
FIG. 5
INVENTOR
H. J. SCHWERDHOFER
BY Young, Emery & Thompson
ATTYS.

March 19, 1957 H. J. SCHWERDHOFER 2,785,586

SHIFT DEVICE

Filed Oct. 6, 1954 7 Sheets-Sheet 3

INVENTOR

H. J. SCHWERDHOFER

BY Young, Emery & Thompson

March 19, 1957 H. J. SCHWERDHOFER 2,785,586

SHIFT DEVICE

Filed Oct. 6, 1954 7 Sheets-Sheet 4

INVENTOR

H. J. SCHWERDHOFER

BY Young, Emery & Thompson

ATTYS.

March 19, 1957 H. J. SCHWERDHOFER 2,785,586
SHIFT DEVICE
Filed Oct. 6, 1954 7 Sheets-Sheet 5

INVENTOR
H. J. SCHWERDHOFER
BY Young, Emery & Thompson
ATTYS.

March 19, 1957 H. J. SCHWERDHOFER 2,785,586

SHIFT DEVICE

Filed Oct. 6, 1954 7 Sheets-Sheet 6

INVENTOR

H. J. SCHWERDHOFER

BY Young, Emery & Thompson

ATTYS.

March 19, 1957 H. J. SCHWERDHOFER 2,785,586

SHIFT DEVICE

Filed Oct. 6, 1954 7 Sheets-Sheet 7

INVENTOR

H. J. SCHWERDHOFER

BY Young, Emery & Thompson

ATTYS.

United States Patent Office 2,785,586

Patented Mar. 19, 1957

1

2,785,586

SHIFT DEVICE

Hans Joachim Schwerdhofer, Schweinfurt, Germany

Application October 6, 1954, Serial No. 460,703

Claims priority, application Germany October 7, 1953

7 Claims. (Cl. 74—489)

This invention relates to shift devices for controlling the selector means of variable speed gears.

In some known forms of variable speed gear shift device, particularly for motor cycles, the shift lever has to travel an extremely great distance. Since shift devices of this kind are usually disposed on the handlebar of the motor cycle it is a drawback to have to operate the shift device when it has to cover a large pivot distance, often as much as 180°. In some cases it is difficult so to dispose the lever that it can be moved past the handlebar stem.

An object of the invention is to provide a variable speed gear shift device in which travel of the shift lever is very small. Each time a different speed is engaged the shift lever returns to its normal position. The small movement and the return into the normal position after the shifting operation are made possible by the cooperation of control curves disposed on the gear shifting gate and on the shift lever. Another object of the invention, in contradistinction to known constructions is to provide a shift device in which the shift gate, to which the usual Bowden cable is secured, carries out a rectilinear movement, so that the cable is in no way twisted or bent. This rectilinear movement can be produced by means of a movable driver fitted between the shift lever and the shift gate. The shift gate may, however, also be moved rectilinearly during the shifting operation by a driver pin fixed on the shift lever. The shift gate with this arrangement must be rocked by a slight amount only after the shifting operation. Through these rectilinear movements varying wire thicknesses may be used whereas with shift devices pulling the Bowden cable by means of a segment a specific wire diameter has to be used on account of the radius of turning. Another object of the invention resides in mounting the shift lever to pivot about a fixed point.

Still another object of the invention is to provide a construction in which the return of the shift lever into the normal position is advantageously effected by a double-acting spring and by the cooperation of a bearing surface of the shift lever with an abutment on the gear shift gate and a cam face on the shift lever, said cam face lifting the pawl away from the teeth of the gear shift gate.

Three exemplary embodiments of the invention are illustrated in the drawings, in various positions of operation.

Figures 1 to 8 show one embodiment of the shift device with a pivoted driver, while

Figures 1, 1A, 2, 3:
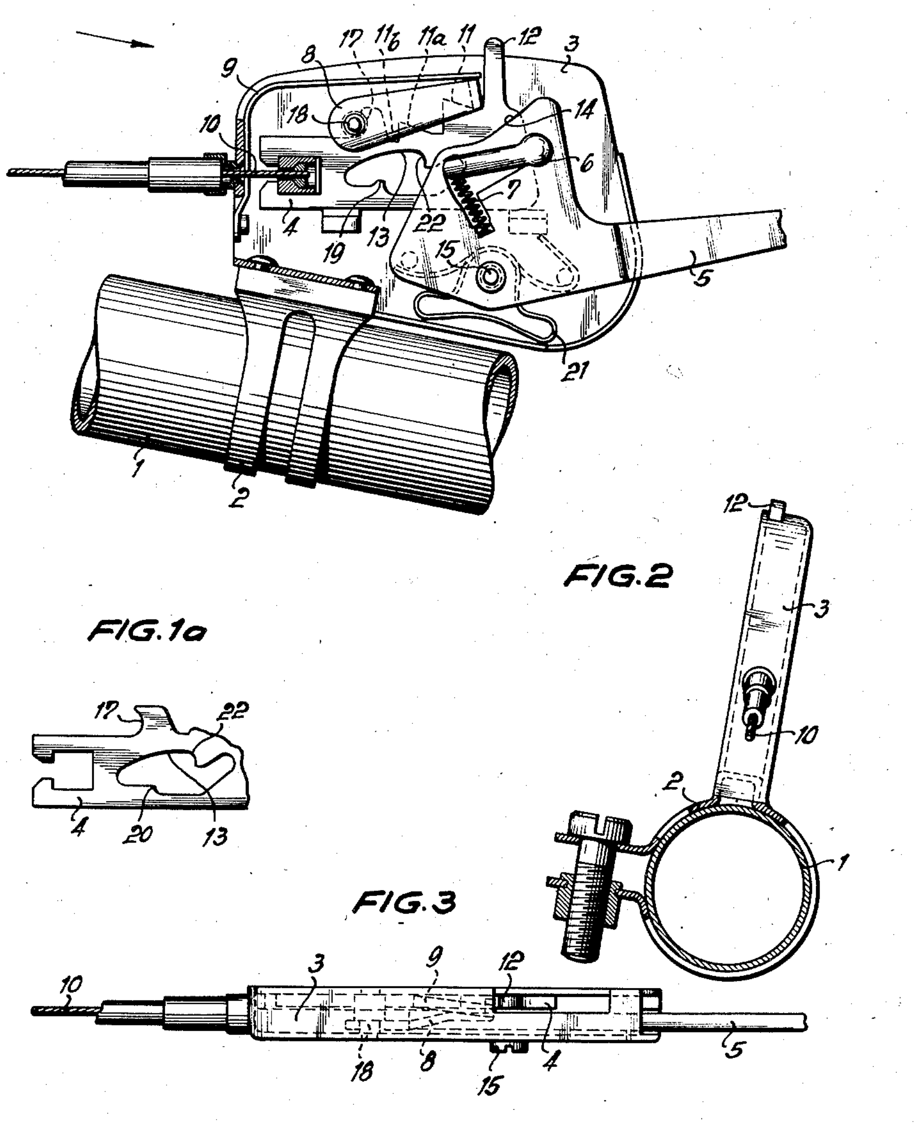

Figure 1 shows the shift device in elevation with the front cover removed and in the position in which the third gear has been put in. The shift device is fastened on the handle-bar stem 1 by means of a clamp 2 and consists of a housing 3, a toothed or stepped gear-shift gate 4, a pivoted shift lever 5, a movable driver 6, which

2 is pushed upward by a spring 7, and a pawl 8, which is pressed against the teeth of the shift gate by a leaf spring 9. The spring-loaded Bowden cable 10 is secured in the shift gate 4. The shift gate 4 carries at its upper part locking teeth 11, 11*a* and 11*b*, and also an indicator 12, and is formed internally with an opening 13. At the top the shift lever 5 carries the control cam face 14.

Figure 2 is an end elevation of Figure 1 in the direction of the arrow, with the cover attached.

Figure 3 is a plan view of the shift device.

Figure 6:
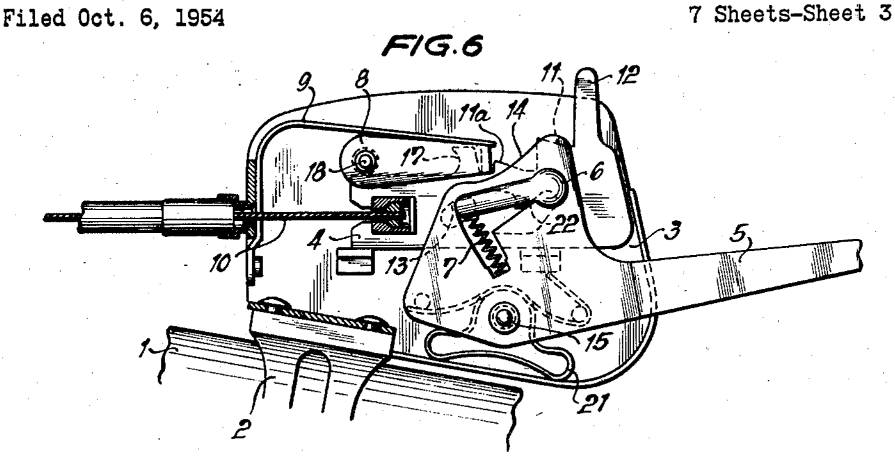
Figure 7:
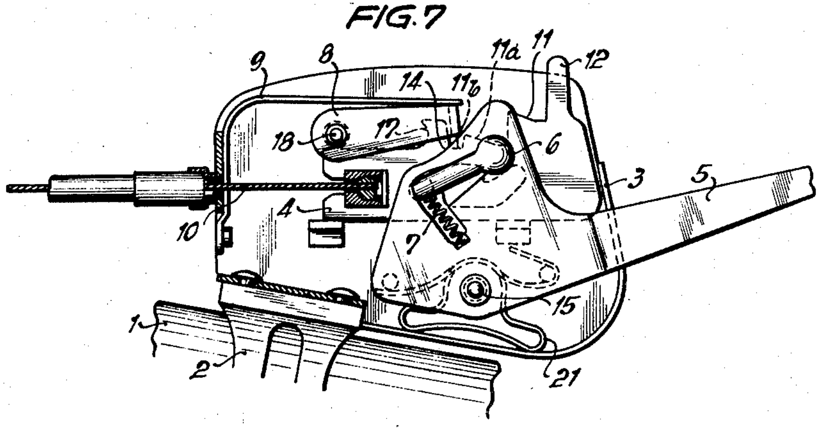
Figure 8:
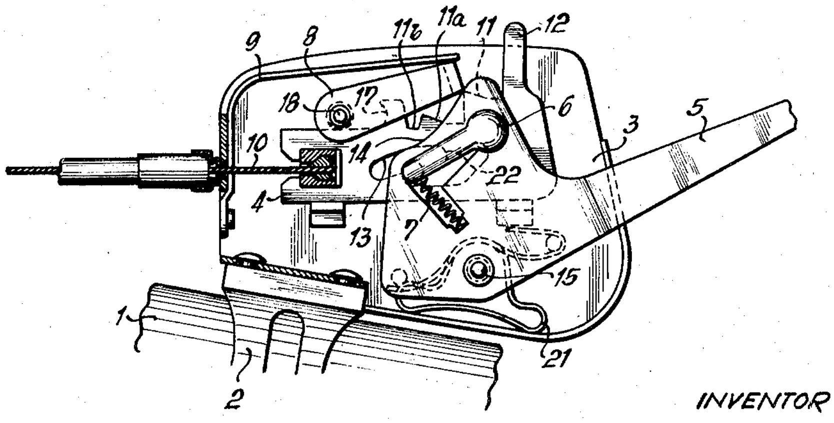

The operation is as follows:

In Figure 1 the shift gate 4 is pulled, by the traction of the Bowden cable 10, completely to the left as far as the stop 17 on the pivot pin 18 of the pawl 8. The pawl 8 is engaged in the step of the tooth 11 at the side of the indicator 12. The driver 6 is situated with its left-hand end on the right-hand end of the opening 13. If the next gear, i. e. the second, is to be engaged the shift lever 5 is simply rocked downwards about its pivot pin 15, against the force of the spring 21. The shift gate 4 is pulled to the right by the downward motion of the lever 5 by means of the movable driver 6. In Figure 4 the pawl 8 is situated in a position directly before engaging in the step of tooth 11*a* for the second gear. A small downward movement of the lever 5 is now adequate for the pawl 8 to engage the tooth 11*a*. As soon as this has been effected the lever 5 is released and returns into the normal position by the pressure of the double spring 21. This position is illustrated in Figure 5. The pawl 8 is engaged in the tooth 11*a*. The lever is in the normal position. The left-hand end of the movable driver 6 is situated approximately in the centre of the opening 13 and engages the projection 22. If the first gear is now to be put in, the lever is again moved downwards. The shift gate 4 is then pulled by the driver 6 into the extreme right-hand position. In this position the pawl 8 engages in the step of tooth 11*b*. After the engagement, the lever 5 is released and returns to the position of rest. This position the shift device is illustrated in Figure 6, the driver 6 engaging the left-hand end of opening 13. If a change has to be made from first gear back to second gear the lever 5 is moved upward out of the normal position. The cam face 14 of said lever then lifts the pawl 8 out of the step of tooth 11*b* as shown in Figure 7. By the traction of the Bowden cable 10 the gate 4 is moved to the left until the pawl 8 engages in the step of the tooth 11*a*. The shift lever 5 is then released and returns through the double spring 21 into the normal position. If a change is to be made from second back to third gear, the shift lever 5 is again moved upwards. The pawl 8 is thereby lifted by the cam face 14 of said lever from the tooth 11*a* of the shift gate. The left-hand part of the driver 6 abuts against the projection 19 of the opening 13. Shifting through from second to first gear is thereby prevented. Instead of the projection 19, a step 20 may be provided according to Figure 1*a*, said step forming a temporary stop for the left-hand end of the driver 6 when lever 5 is rocked upwardly but being jumped over by the driver when the lever is rocked downwardly. This position is shown in Figure 8. The shift gate 4 is then again pulled to the left by the traction of the Bowden cable 10 and the position according to Figure 1 is reached.

It is clear from the drawings that any change can be effected by a small movement of the shift lever 5 upwardly or downwardly. Space for the small travel of the shift lever 5 is available at any point on the motor cycle handle-bar.

Figure 9:
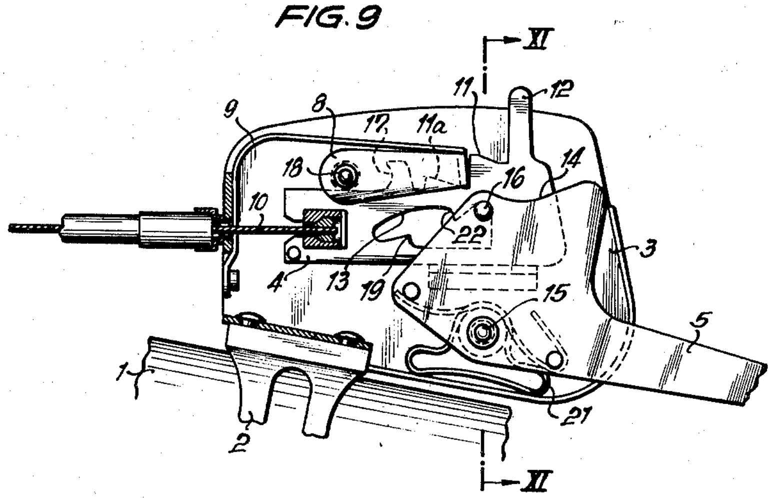
Figures 9 to 11 show the shift device with a fixed driver.
Figure 10:
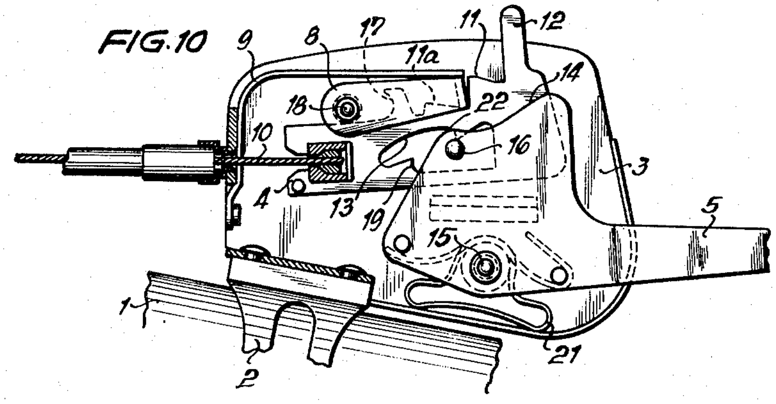
Figure 11:
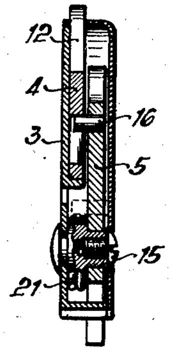

Figures 9 through 11 show a simplified embodiment of the shift device, the movable driver being replaced by a fixed drive pin 16 secured to the shift lever 5. The other of the shift device are the same as in Figures 1 through 8. Figure 9 shows the position of the shift device according to Figure 5, but before the return of the shift lever into the normal position. The fixed driver 16 has pulled the shift gate 4 to the right through the opening 13. The gate is situated in the position for second gear.

Figure 10 shows the shift device at the moment in which when the lever is returned into the normal position by the spring 21 the shift gate 4 is lifted slightly by engagement of the fixed driver pin 16 on the lever 5 with the projection 22 of opening 13. Thus whereas the movement of the shift gate is perfectly rectilinear in the embodiment according to Figures 1 to 8, in the construction according to Figures 9, 10 and 11 it is rectilinear during shifting but after shifting there is a slight rocking out of the gate 4.

Figure 11 shows a section according to the section line A—B in Figure 9, through the shift device.

According to the exemplified embodiment illustrated in Figures 12–18, the shift device is fastened on the handle-bar stem 1' by a clamp 2'. The housing 3' encloses one end of the shift lever 5' with the curve 14'. The shift lever 5' pivots about the bolt 15'. This bolt serves at the same time as a pivot point for the fork-shaped wire spring 27, the ends of which, in the centre position of the lever abut against opposite ends of a stop 28 fixed on the housing. On rocking the lever in either direction, one end of the spring is deflected by the bolt 29 the other end remaining against the stop. Also rockable about the bolt 15' is the quadrant shift gate 4', which on one side is provided with an abutment 30 and on the other side with the tooth steps 11', **11*a'* and 11*b'*, while an indicator 12' for indicating the gear is mounted on the upper side of the gate. The pawl 8' is urged into engagement with the teeth by the pawl spring 9'. The Bowden cable 10' is secured in the shift gate 4' by means of the stud 31**.

Figure 12:
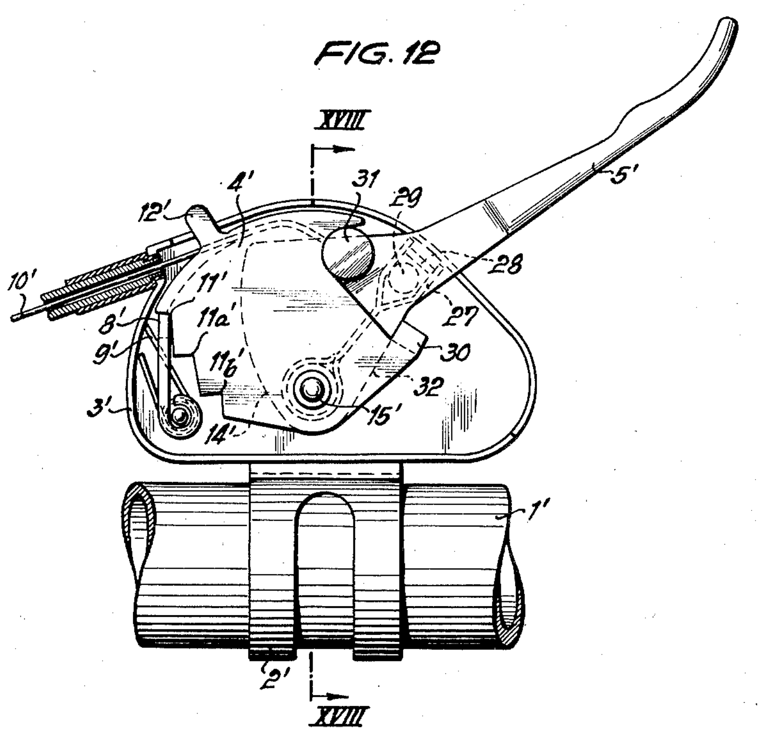
Figures 12 to 18 show a further embodiment of the shift device.

The mode of operation is as follows:

In Figure 12 the shift gear is situated in a position inclined to the left which corresponds to the third gear position shown in Figure 1. The shift lever 5' has been returned to the middle position by the spring 27. The pawl 8' is engaged in the top tooth step 11'. The abutment 30 lies against the bearing surface 32 of the shift lever 5'. The indicator 12' is situated in the extreme left-hand position.

Figure 13:
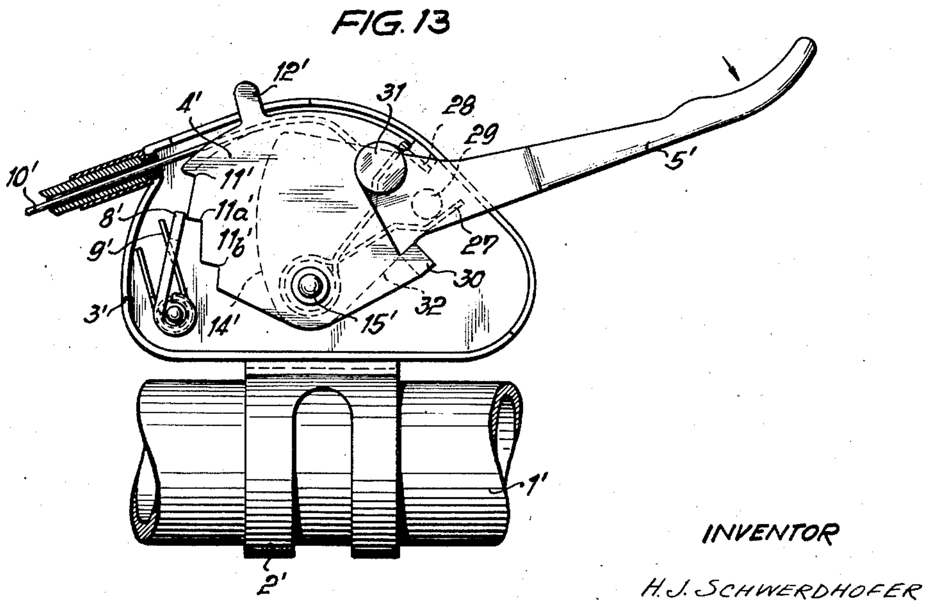
Figures 14, 16:
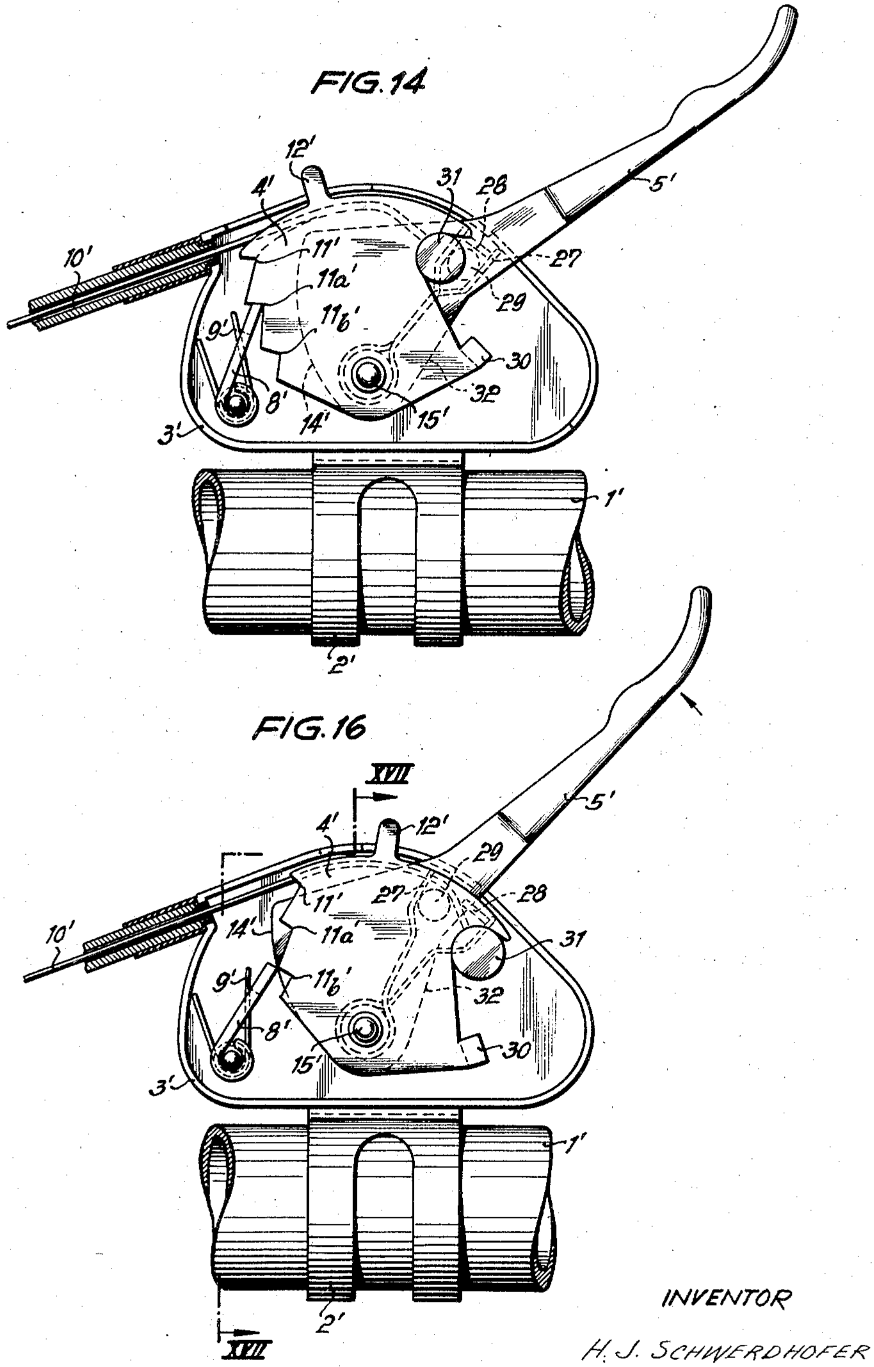

Figure 13 illustrates an intermediate stage in the shift from the position according to Figure 12 into that of Figure 14. The shift lever 5' has been moved downward. The shift gate 4' has been rocked through the abutment 30, which lies against the bearing surface 32 of the shift lever 5'. The pawl 8' is in a position shortly before engaging in the middle tooth step **11*a'*. The wire spring 27 is tensioned. One arm thereof lies against the stop 28, whereas the other arm has been moved by the pin 29 on the shift lever. The shift lever 5' must be kept under finger pressure until the pawl 8' has engaged the step of tooth 11*a'***.

Figure 14 shows the position of the shift device with the middle gear put in. The shift lever has returned to the normal position. The pawl 8' is engaged in the middle tooth step **11*a'*. The spring 27, which has restored the shift lever to the middle position, has slackened. The indicator 12'** indicates the middle position corresponding to second gear.

Figure 15:
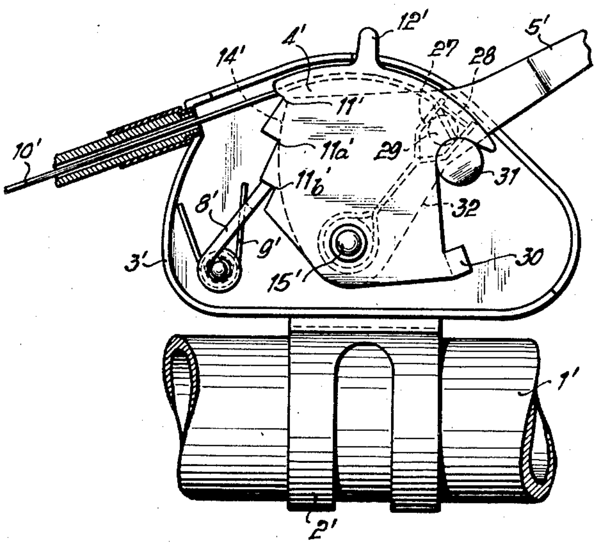

In Figure 15 the shift gate 4' is situated in a position inclined to the right. The shift lever 5' has returned to the normal position. The pawl 8' has engaged in the lower tooth step **11*b'*. The wire spring 27, which has restored the shift lever into the normal position, has slackened. The indicator 12'** indicates the extreme right position corresponding to bottom gear.

Figure 16 shows the position of the shift device during shifting from the position according to Figure 15 to that of Figure 14. By finger pressure from below the shift lever 5' has been pushed into an upper position. The wire spring 27 is tensioned. The pawl 8' is lifted out of the lowest tooth step **11*b'* by the cam face 14' on the shift lever 5'. Through the traction of the Bowden cable 10' the shift gate 4' is rotated until the pawl 8' comes to rest in the middle tooth step 11*a'***.

Figure 17:
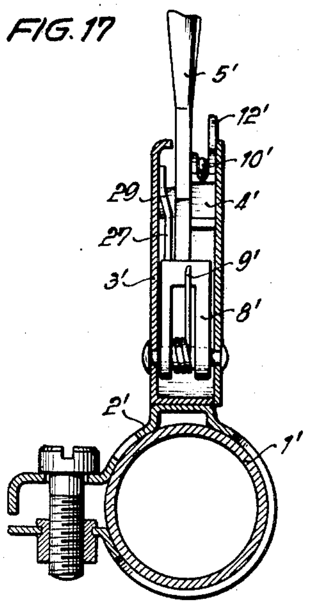
Figure 18:
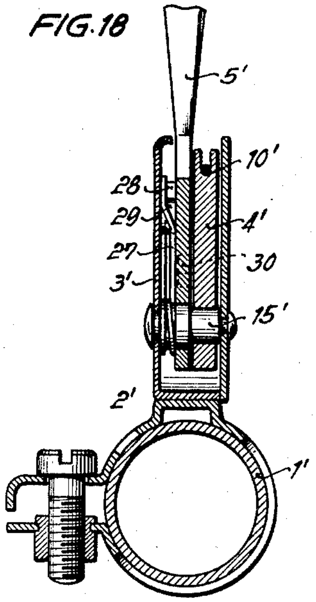

Figures 17 and 18 show individual parts of the shift device in section respectively on the line C—D in Figure 16 and line E—F in Figure 12.

I claim:

1. A shift device for controlling the selector means of a variable speed gear through a flexible cable which is spring-loaded in one direction of movement, comprising a housing, a toothed shift gate movable in said housing and connected to said cable, a spring-pressed pawl for engaging the teeth of the shift gate to retain the latter in successively spaced positions, a manually operable lever mounted in the housing for angular movement about a stationary axis in opposite directions from a center position, a lost motion connection between the shift gate and the lever for transmitting movement of the lever in one direction from its center position to move said shift gate against the pull of the cable, means movable with said lever for withdrawing the pawl from an engaged tooth of the shift gate upon actuation of the lever in the opposite direction from its center position thereby to permit the pull on the cable to move the shift gate in the other direction, and means for resiliently centering the lever upon the engagement of the pawl with another tooth of the shift gate and the withdrawal of manual pressure from said lever.

2. A shift device as claimed in claim 1, wherein the lever is formed with a cam face engageable, upon angular movement of said lever in said opposite direction, with the pawl thereby to withdraw said pawl from an engaged tooth on the shift gate.

3. A shift device for controlling the selector means of a variable speed gear through a flexible cable which is spring-loaded in one direction of movement, comprising a housing, a toothed shift gate mounted in said housing for rectilinear sliding movement and connected to said cable, a spring-pressed pawl for engaging the teeth of the shift gate to retain the latter in successively spaced positions, a manually operable lever mounted in the housing for angular movement about a stationary axis in opposite directions from a center position, a member movable with said lever and slidably engaging in an elongated opening in the shift gate, abutments in said opening engageable by said member for transmitting movement of the lever in one direction from its center position to move the shift gate against the pull of the cable, means movable with said lever for withdrawing the pawl from an engaged tooth of the shift gate upon actuation of the lever in the opposite direction from its center position thereby to permit the pull on the cable to move the shift gate in the other direction, and means for resiliently centering the lever upon the engagement of the pawl with another tooth of the shift gate and the withdrawal of manual pressure from said lever.

4. A shift device as claimed in claim 3, wherein the member slidably engaging in the opening in the shift gate is pivotally mounted in the lever and is spring-loaded to engage the abutments in said opening.

5. A shift device as claimed in claim 3, wherein the member slidably engaging in the opening in the shift gate comprises a pin fixed on the lever, and wherein the shift gate is mounted to allow for rocking movement transversely of its rectilinear movement when the pin slides over the abutments in said opening.

6. A shift device as claimed in claim 3, wherein the cable is guided into the housing by a nipple arranged so that the portion of the cable extending between the nipple and the shift gate is aligned with the direction of sliding movement of said gate.

7. A shift device for controlling the selector means of a variable speed gear through a flexible cable which is spring-loaded in one direction of movement, comprising a housing, a toothed shift quadrant pivoted in said housing and connected to said cable, a spring-pressed pawl for engaging the teeth of the shift quadrant to retain the latter in successively spaced angular positions, a manually operable lever also pivoted in the housing for angular movement in opposite directions from a center position, the quadrant and the lever pivoting about a common fixed axis, an abutment on the quadrant engageable by the lever for transmitting movement of the lever in one direction from its center position to rotate the quadrant against the pull of the cable, means movable with the lever for withdrawing the pawl from an engaged tooth of the shift gate upon actuation of the lever in the opposite direction from its center position thereby to permit the pull on the cable to rotate the quadrant in the other direction, a forked spring anchored in the housing, a stud on said lever interposed between the arms of the spring, and a fixed abutment also interposed between the arms of the spring, said abutment and stud effecting tensioning of the spring in either direction of rotation of the lever thereby to return said lever to its center position upon engagement of the pawl with another tooth of the quadrant and the withdrawal of manual pressure from said lever.

References Cited in the file of this patent

UNITED STATES PATENTS

| | | |
|---|---|---|
| 2,534,566 | Yapp | Dec. 19, 1950 |
| 2,560,154 | Brown | July 10, 1951 |